United States Patent [19]
Spillmann et al.

[11] 3,802,044
[45] Apr. 9, 1974

[54] CONTROLLED DEFLECTION ROLL

[75] Inventors: Werner Spillmann, Kilchberg; Alfred Christ, Zurich; Rolf Lehmann, Mutschellen, all of Switzerland; Erwin Muehle, Ravensburg, Germany

[73] Assignee: Escher Wyss Limited, Zurich, Switzerland

[22] Filed: June 27, 1972

[21] Appl. No.: 266,637

[30] Foreign Application Priority Data
June 28, 1971  Switzerland................. 9428/71

[52] U.S. Cl............................................ 29/113 AD
[51] Int. Cl............................................. B21b 31/32
[58] Field of Search...... 29/116 AD, 113 AD, 116 R

[56] References Cited
UNITED STATES PATENTS
R26,219    6/1967   Kusters et al. ............ 29/116 AD X
3,581,359  1/1971   Board et al. ................. 29/116 AD
3,587,152  6/1971   Hold .............................. 29/116 AD
3,119,324  1/1964   Justus....................... 29/116 AD X
3,726,338  4/1972   Sorenson................... 29/116 AD X Primary Examiner—Alfred R. Guest
Attorney, Agent, or Firm—Austin P. Dodge; Robert A. Ostmann

[57] ABSTRACT

Roll with bending compensation, for pressure rolling of paper webs, having a rotatable shell, a stationary shaft and at least one pressure element arranged between shell and yoke; a hydrostatic bearing chamber between shell and pressure element, and a servomotor pressure chamber between pressure element and shaft; the servomotor chamber connected to a pressure medium conduit, and the bearing chamber connected to said conduit via a throttling arrangement; the piston of said servomotor being tiltably guided within the cylinder of said servomotor.

9 Claims, 9 Drawing Figures

CONTROLLED DEFLECTION ROLL

BACKGROUND OF THE INVENTION

The invention relates to a roll bending compensation, for the pressure treatment of webs of material, more especially paper webs. This roll comprises a hollow cylindrical rotatable shell and a stationary shaft which extends through the said shell and is supported at both its ends. A pressure element is guided in the shaft to be displaceable radially to the axis of the roll, and is situated between the shell and the shaft. The pressure chamber of a hydrostatic bearing is provided between the rotatable shell and the pressure element, and between the pressure element and the shaft there is formed a pressure chamber of a servomotor used for displacing the pressure element towards the shell. The pressure chamber of the servomotor is connected to a pressure medium supply conduit, whereas the pressure chamber of the hydrostatic bearing is connected to the said supply conduit via a throttling arrangement.

A roll of this kind with an arrangement for compensating for bending of the shaft is known from U.S. Pat. No. 3,587,152. The arrangement described is intended to ensure that for a given thickness of pressure medium film at the hydrostatic bearing a stable equilibrium prevails between the force exerted on the pressure element by the pressure chamber of the hydrostatic bearing and the force exerted by the pressure chamber of the servomotor on the pressure element.

In the case of the roll proposed in U.S. Pat. No. 3,587,152 however, this stable equilibrium can only be established if the treatment pressure of the roll is very small. For higher treatment pressures, such as are required when treating paper webs, the known roll is not suitable. If the diameter of the roll is not made excessively great, the shaft is subjected to considerable deflection, i.e. bending when there is relatively high treatment pressure. The angle of inclination of the shaft relatively to the roll axis may readily be in the region of 1°. The pressure element is guided in a bore of the shaft.

Since in the case of the roll proposed in the U.S. Pat. Specification No. 3,587,152, the pressure element is inclined to the same extent as the shaft relatively to the shell of the roll, the pressure medium gap between the shell and the pressure element is wedge-shaped, so that the hydrostatic bearing is no longer capable of operating. Metal-to-metal contact occurs between shell and pressure element, and also jamming between pressure element and shaft. By arranging the pressure elements in two rows out of the bending plane of the shaft, the pressure elements are in fact subjected only to a partial component of the bending of the shaft, but this is still too much for the high treatment pressures which are required.

SUMMARY OF THE INVENTION

The invention has as its object to achieve the automatic maintenance of a desired pressure medium film thickness at the hydrostatic bearing even with rolls using high treatment pressures.

This object is achieved in that the piston and the cylinder of the servomotor are guided so as to firstly allow displacement relatively to one another in the axial direction of the servomotor and secondly be tiltable relatively to one another, so that the pressure element is held in the axial direction and peripheral direction of the roll but otherwise floats in mobile fashion on the pressure medium situated in the pressure chamber of the servomotor.

This floating mounting of the pressure element relatively to the yoke allows the pressure element to adapt itself unhindered to the rotatable shell irrespective of how the shaft may be inclined relatively to the shell. The floating mounting of the pressure element relatively to the yoke, however, also has the further advantage that in the peripheral direction of the roll also it permits automatic adaptation of the position of the pressure element relatively to the shell with regard to the pressure medium film at the hydrostatic bearing.

A particularly good adaption of the pressure element relatively to the rotatable shell is achieved by subdividing the bearing recess of the hydrostatic bearing by a partition into part-chambers situated side by side with respect to the wall of the shell, whereby two part-chambers are connected to the pressure medium supply conduit by means of throttling ducts which are separate from one another.

BRIEF DESCRIPTIONS OF THE DRAWING

Constructional examples of the invention are shown in simplified manner in the drawing and will be described in detail hereinafter. In the drawing.

Figure 2:
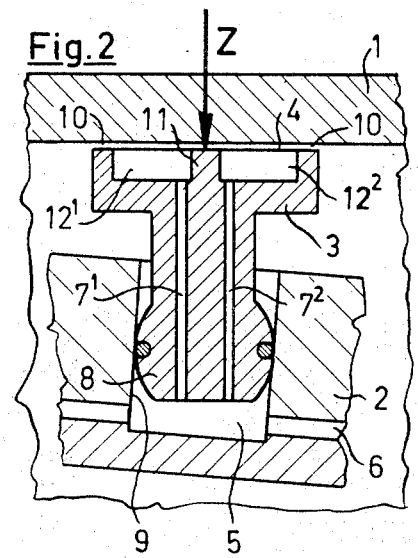
FIG. 2 shows a fragmentary view of FIG. 1 on a larger scale.
Figure 4:
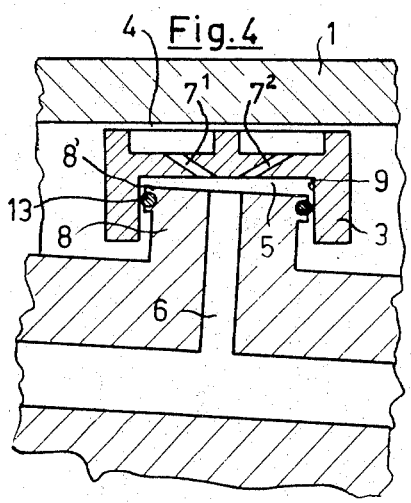
Figure 5:
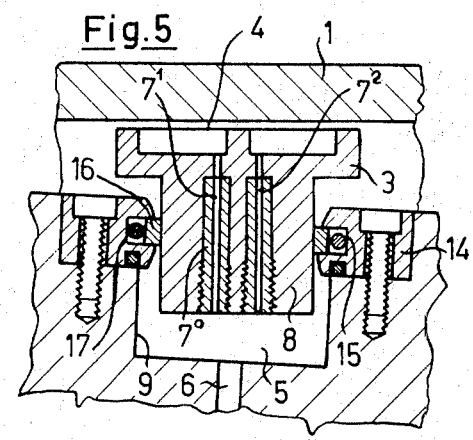
Figure 6:
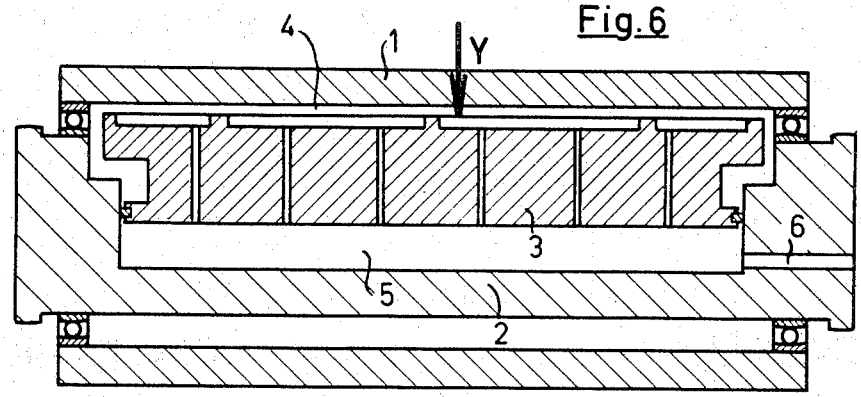
Figure 7:
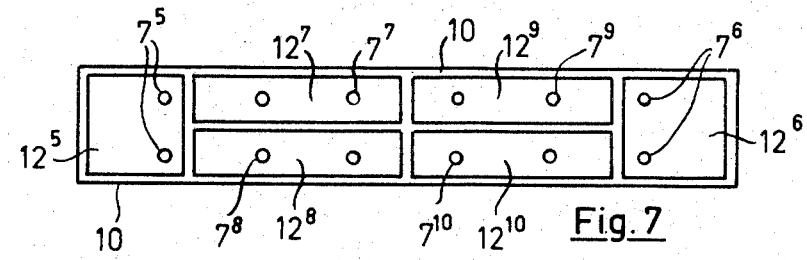
Figure 8:
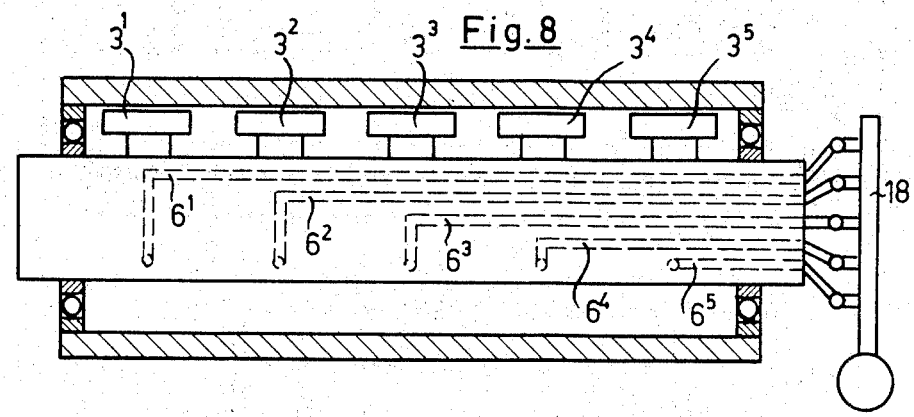
Figure 9:
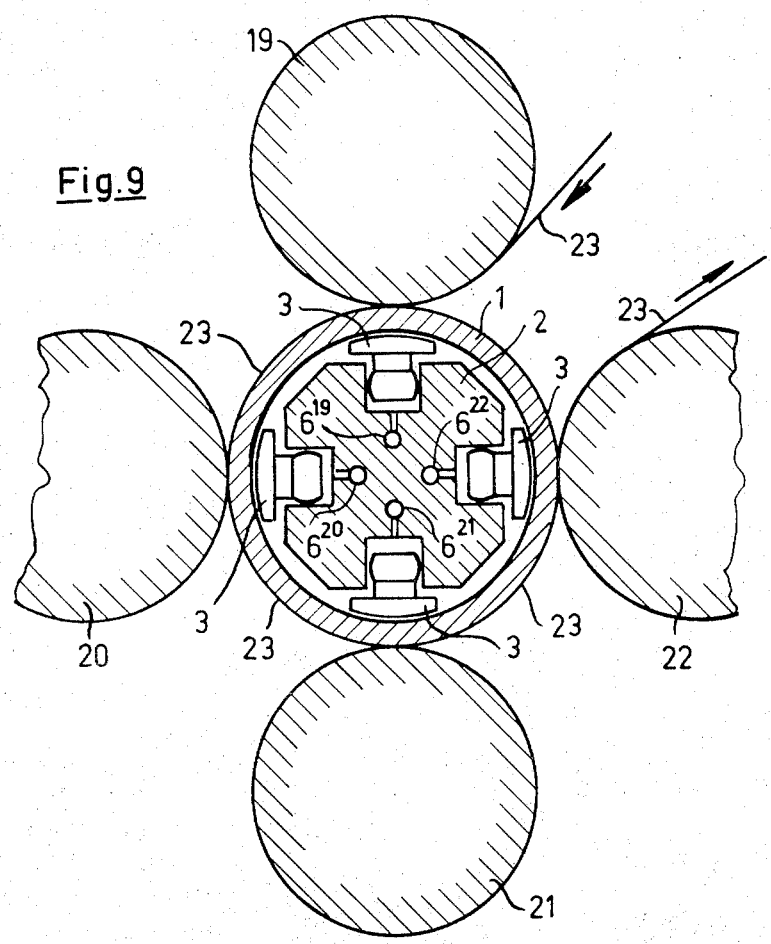

FIG. 4 shows a fragmentary view in the manner of FIG. 2, illustrating another constructional example, FIG. 5 shows a fragmentary view in the manner of FIG. 2, showing a further constructional example, FIG. 6 shows a vertical axial section through a further roll with bending compensation, FIG. 7 shows a view in the direction of the arrow Y in FIG. 6, FIG. 8 shows a vertical axial section through a further roll, FIG. 9 shows a cross-section through a roll with four counter-rolls.

DESCRIPTION OF THE PREFERRED EMBODIMENTS

Figure 1:
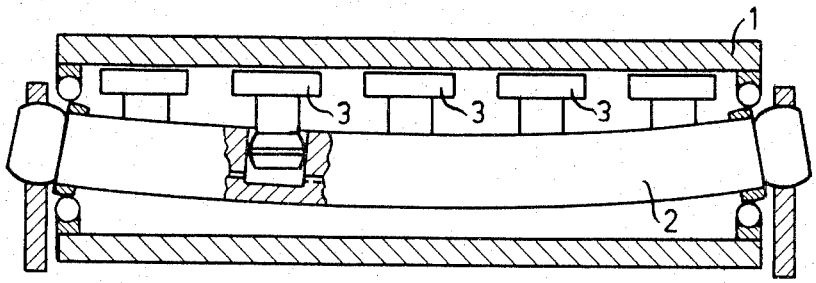
FIG. 1 shows a vertical axial section through a roll with bending compensation.
Figure 3:
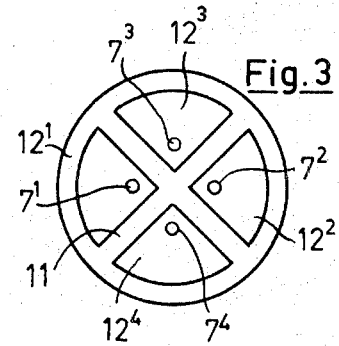
FIG. 3 shows a view in the direction of the arrow Z in FIG. 2.

The roll for the pressure treatment of paper webs which is shown in FIG. 1 to 3 comprises a hollow cylindrical rotatable shell 1 and a stationary shaft 2 which extends through the said shell and is supported at its two ends. Between the shell 1 and the shaft 2 there are situated pressure elements 3 which are guided to be displaceable in the shaft 2 radially with respect to the axis of the roll or the shaft. Between the rotatable shell 1 and the pressure element 3 there is formed the pressure chamber 4 of a hydrostatic bearing for the shell 1 on the pressure element 3. Between the pressure element 3 and the shaft 2 is formed the pressure chamber 5 of a servomotor used for displacing the pressure element 3 towards the shell 1. The pressure chamber 5 of the servomotor is connected to a supply conduit 6 for pressure medium. The pressure chamber 4 of the hydrostatic bearing is connected to the supply conduit 6 through a throttling arrangement, comprising throttling ducts $7^1$, $7^2$, $7^3$ and $7^4$.

A piston 8, formed by the lower end of the pressure element 3, and a servomotor cylinder 9 formed by a bore provided in the shaft 2 are guided to be displaceable relatively to one another in the axial direction of the servomotor i.e. substantially radially with respect to the axis of the roll or the axis of the shaft. But this guiding arrangement allows the piston 8 to tilt relatively to the cylinder 9. Thus the pressure element 3 is held in the axial direction and in the peripheral direction of the roll but otherwise is mobile in floating fashion on the pressure medium situated in the pressure chamber 5 of the servomotor. As FIG. 2 shows more especially, in this way the pressure element 3 can take up a stable equilibrium position between the rotatable shell 1 and the stationary yoke 2. This position of equilibrium is stable in two respects.

Firstly, the pressure medium coming from the supply conduit 6 into the pressure chamber 5 presses the pressure element 3 towards the shell 1. Pressure medium flows from the pressure chamber 5 through the throttling arrangement $7^1$ to $7^4$ with pressure loss into the pressure chamber 4. By way of the edge zone 10 of the pressure chamber 4, pressure medium flows with expansion to atmospheric pressure into the intermediate space between shell 1 and shaft 2. The quantity of this outflowing pressure medium determines the amount of the pressure loss in the throttling arrangement $7^1$ to $7^4$. The pressure element 3 floats in a position of stable equilibrium between the yoke 2 and the shell 1, in which position of equilibrium the outflowing pressure medium quantity is kept constant, and thus the thickness of the pressure medium film in the edge zone 10 also remains constant.

Secondly, the pressure element 3 floats in a stable equilibrium position as regards its inclination relatively to the shell 1. Whereas the pressure element 3 is freely mobile relatively to the shaft 2 owing to the floating mounting on the pressure medium situated in the pressure chamber 5, the pressure medium situated in the edge zone 10 of the pressure chamber 4 causes the thickness of the pressure medium film to remain the same over the entire circumference of the edge zone 10. For if for example the left-hand portion of the edge zone 10 in the drawing became thicker, and the portion of the edge zone 10 shown at the right in the drawing became thinner, in the region of the left-hand portion of the edge zone 10 the pressure of the pressure medium would be reduced whereas the pressure of the pressure medium would be increased in that portion of the edge zone 10 which is situated at the right in the drawing. Thus the pressure element 3 would again be pressed into its middle position relatively to the shell 1.

Advantageously a further aid is provided for achieving the stabilisation discussed second. This is provided in the embodiment by sub-dividing the bearing recess of the hydrostatic bearing for the shell 1 on the pressure element 3 by a partition 11 into four part-chambers $12^1$, $12^2$, $12^3$ and $12^4$ situated one beside the other with respect to the wall of the shell 1. The part chambers $12^1$ to $12^4$ are connected by the throttling ducts $7^1$, $7^2$, $7^3$, $7^4$ respectively which are separate from one another, via the pressure chamber 5 of the servomotor to the supply conduit 6 for pressure medium; that is to say from the pressure conduit 6 the separate throttling duct $7^1$ leads to the part-chamber $12^1$, the separate throttling duct $7^2$ to the part-chamber $12^2$ etc..

In this way inclination of the pressure element 3 relatively to the shell 1 is even more effectively prevented. If for example the thickness of the portion of the edge zone 10 situated at the left in the drawing became greater, and the thickness of the portion of the edge zone 10 situated at the right in the drawing became thinner, more pressure medium would run out of the part-chamber $12^1$ and less pressure medium would run out of the part-chamber $12^2$. Accordingly, the pressure in the part-chamber $12^1$ would drop but the pressure in the part-chamber $12^2$ would rise. Since thus the greater part of the effective pressure transmission surface between shell 1 and pressure element 3 participates in this restoring action into the middle position, an extremely effective stabilisation is obtained. As the part-chamber $12^1$ and $12^2$ stabilise the pressure element 3 against tilting relatively to the shell 1 in the plane passing through the axis of the roll, the part-chambers $12^3$ and $12^4$ attend to stabilising against tilting in the plane at right angles to the axis. In the simplest case, three part-chambers situated side by side in two directions deviating from one another would be sufficient for stabilisation.

Stabilisation against inclination in the plane at right angles to the axis is particularly advantageous when there are high peripheral speeds at the shell 1, and can be further improved in the embodiment shown in FIG. 1 to FIG. 3 if one of the two runs of the partition 11 extends parallel to the axis of the roll. The cross formed by the partition 11 shown in FIG. 3 would then be rotated through an angle of 45° relatively to the illustrated position, and the entire area of the part-chambers would be used for stabilisation. The part-chambers of a pressure element 3 may differ in size from one another.

Sub-dividing the bearing recess of the hydrostatic bearing into two or more part-chambers also permits the edge zone 10 of the hydrostatic bearing, and therefore the frictional losses of the said bearing, to be kept small. The edge zone of the hydrostatic bearing is not required for stabilisation in the event of said sub-dividing.

Whereas in the embodiment shown in FIG. 1 to FIG. 3 the piston 8 of the servomotor has a spherically rounded portion, the piston of the servomotor in the embodiment shown in FIG. 4 has a rim 8' which is short in the axial direction of the servomotor and by means of which the piston is guided in the cylinder 9 of the servomotor. Except of said rim 8', an intermediate space remains between the piston 8 and the wall of the cylinder 9. The pressure element 3 is so constructed that the width of the pressure transmission surface between shell 1 and pressure element 3 is greater than the spacing between this pressure transmission surface and the guide guiding the piston and the cylinder of the servomotor relatively to another. In this way the position of equilibrium of the pressure element 3 is made extremely stable. To seal the gap between the piston 8 and the cylinder 9 of the servomotor there is provided a sealing element 13 which permits the necessary tilting or inclination of the piston relatively to the cylinder.

In the embodiment shown in FIG. 5, the piston 8 of the servomotor is formed by the lower end of the pressure element 3. Here, the piston 8 is cylindrical and surrounded by a ring 14 secured to the cylinder 9 of the servomotor. This ring 14 is internally shaped in paraboloid form i.e. internally bevelled, and is so short in the axial direction of the servomotor that it permits the axis of the piston 8 to tilt relatively to the axis of the cylinder 9. Arranged at the inner side of the ring 14 is a groove 15 in which there is situated a sealing ring 16 made of plastics material contacting the piston 8. This sealing ring 16 is pressed by means of a rubber-O-ring 17 towards the piston 8. The throttling ducts $7^1$ and $7^2$ are situated in a screw-out part $7^0$ so that they can be interchanged with others having a different throttling effect.

Owing to said sub-dividing into part-chambers the pressure element 3 may also, as the embodiment shown in FIG. 6 and FIG. 7 illustrates, be constructed as a bar extending in the axial direction of the roll and substantially over the entire length of the roll. The bearing recess of the hydrostatic bearing arrangement formed between the shell 1 and the pressure element 3 is sub-divided in the axial direction of the roll into four part-chambers. The two central ones of these four part-chambers are again sub-divided each into two part-chambers in the peripheral direction of the roll. The individual part-chambers are designated in FIG. 7 as as $12^5$, $12^6$, $12^7$, $12^8$, $12^9$, $12^{10}$. From the supply conduit 6, throttling ducts $7^5$ lead into the part-Cahmber $12^5$, throttling ducts $7^6$ into the part-chamber $12^6$ etc.. For each part-chamber the dimensions of the associated throttling ducts are so adjusted to the dimensions of the part of the edge zone 10 of the hydrostatic bearing serving the same part-chamber as an overflow portion, that the pressure of the pressure medium in all the part-chambers is the same for the same thickness of pressure medium film at the edge zone 10 in all the part-chambers.

The roll shown in FIG. 8 comprises a plurality of pressure elements which are arranged in a row in the direction of the axis of the roll and are designated as $3^1$, $3^2$, $3^3$, $3^4$ and $3^5$. These pressure elements are not connected to a common supply conduit 6, but a separate supply conduit $6^1$, $6^2$, $6^3$, $6^4$, $6^5$ respectively leads to each pressure element. The conduits $6^1$ to $6^5$ can be provided with pressure medium at various selectable pressures by means of a regulating device 18. For, owing to the two fold stabilisation described, it is possible to vary within wide limits the force transmitted by the pressure element from the shaft 2 to the shell 1. The stabilised pressure element 3 still runs satisfactorily even when the forces to be transmitted are very small. In this way the distribution of the treatment pressure over the width of the roll can be adapted to many different kinds of operating conditions. For example the treatment pressure at the edges of the paper web can be made weaker, or parts of the roll can co-rotate in pressureless manner when treating relatively narrow webs.

The satisfactory stabilisation of the pressure element, however, also has the result that the frictional heat produced per unit of time at the hydrostatic bearing remains substantially constant. As a result the following is possible. In the case of rolls which have pressure elements arranged in a row in spaced relationship in the axial direction, the temperature of the pressure medium can be regulated to a value at which the quantity of heat given off owing to friction in the hydrostatic bearing to the shell 1 and the quantity of heat given off by the shell 1 to the pressure medium are equal in magnitude. Thus heating of the shell 1 in the region of the pressure elements 3 is obviated.

Since the pressure elements 3 always align themselves relatively to the shell 1, the roll may also be used in a central arrangement as FIG. 9 shows, wherein the roll operates against counter-rolls 19, 20, 21, 22 and correspondingly comprises several rows of pressure elements 3, following one another in the peripheral direction of the roll. For each row of pressure elements 3 a special supply conduit is provided, namel the conduit $6^{19}$, $6^{20}$, $6^{21}$, $6^{22}$ respectively. Theses supply conduits can be supplied with pressure medium at various pressures so that the paper web 23 can be progressively rolled.

Since the surface of the pressure element 3 facing towards the shell 1, at least the surface of its edge zone 10, is in the form of a segment of a cylinder, it is advantageous for bringing the roll into operation if the pressure elements comprising a circular-cylindrical servomotor are secured against rotation about the servomotor axis. This can advantageously be effected by connecting two pressure elements by means of rods inserted loosely in bores of the pressure elements.

We claim:

1. Roll with bending compensation, for the pressure treatment of webs of material, especially paper webs; said roll including a hollow cylindrical rotatable shell and a stationary yoke extending through said shell; a pressure medium supply conduit arranged in said yoke; at least one pressure element arranged between said shell and said yoke; a hydrostatic bearing provided between said shell and said pressure element, including a first pressure chamber; a servomotor provided between said pressure element and said yoke, including a piston, a cylinder and a second pressure chamber, for displacing said pressure element towards said shell; said second pressure chamber of said servomotor being connected to said pressure medium supply conduit; a throttling arrangement connecting said first pressure chamber of said hydrostatic bearing to said pressure medium conduit; the improvement that said piston of said servomotor is tiltably guided within said cylinder of said servomotor, said pressure element thus being held in the axial and peripheral direction of said roll but being otherwise mobile floating on said pressure medium situated in said second pressure chamber.

2. Roll according to claim 1, in which a partition subdivides said first pressure chamber of said hydrostatic bearing into part-chambers situated adjacent one another with respect to the wall of said shell, said throttling arrangement connecting one of said part-chambers to said supply conduit; and another throttling arrangement connecting another one of said part-chambers to said supply conduit.

3. Roll according to claim 2, in which at least three of said part-chambers are arranged adjacent one another in two different directions.

4. Roll according to claim 1, in which said piston of said servomotor has a spherically rounded portion, and is tiltable in said cylinder about the centre of said spherically rounded portion.

5. Roll according to claim 1, in which said piston comprises a rim which is short in the axial direction of said piston; said rim guiding said piston in said cylinder, but, except of said rim, an intermediate space being provided between said piston and the wall of said cylinder.

6. Roll according to claim 1, in which said piston is cylindrical in form and said cylinder comprises a ring which is short in the axial direction of said cylinder; said ring guiding said piston in said cylinder, but, except of said ring, an intermediate space being provided between said piston and said cylinder.

7. Roll according to claim 1, in which the width of the pressure transmission surface effective between said shell and said pressure element is greater than the spacing between said pressure transmission surface and the centre of said tiltable guiding of said piston within said cylinder.

8. Roll according to claim 1, comprising; two or more of said pressure elements following each other in the peripheral direction of said roll.

9. Roll according to claim 1, in which two or more pressure elements are provided; at least one other pressure medium supply conduit arranged in said yoke; one of said pressure elements being connected to said pressure medium supply conduit, and another one of said pressure elements being connected to said other pressure medium supply conduit.

\* \* \* \* \*